US006770183B1

(12) United States Patent
Hencken et al.

(10) Patent No.: US 6,770,183 B1
(45) Date of Patent: Aug. 3, 2004

(54) ELECTROKINETIC PUMP

(75) Inventors: Kenneth R. Hencken, Pleasanton, CA (US); George B. Sartor, Tracy, CA (US)

(73) Assignee: Sandia National Laboratories, Livermore, CA (US)

( * ) Notice: Subject to any disclaimer, the term of this patent is extended or adjusted under 35 U.S.C. 154(b) by 343 days.

(21) Appl. No.: 09/916,717

(22) Filed: Jul. 26, 2001

(51) Int. Cl.[7] ........................ G01N 27/447; F04F 11/00
(52) U.S. Cl. ........................................ 204/600; 417/48
(58) Field of Search .................... 417/48, 50; 204/450, 204/600

(56) References Cited

U.S. PATENT DOCUMENTS 3,923,426 A * 12/1975 Theeuwes .................. 204/630
5,885,470 A * 3/1999 Parce et al. .................. 216/33
6,013,164 A * 1/2000 Paul et al. .................. 204/450
6,019,882 A * 2/2000 Paul et al. .................. 204/450
2002/0166592 A1 * 11/2002 Liu et al. .................. 137/825

* cited by examiner

*Primary Examiner*—Kaj K. Olsen
(74) *Attorney, Agent, or Firm*—Donald A. Nissen

(57) ABSTRACT

An electrokinetic pump in which the porous dielectric medium of conventional electrokinetic pumps is replaced by a patterned microstructure. The patterned microstructure is fabricated by lithographic patterning and etching of a substrate and is formed by features arranged so as to create an array of microchannels. The microchannels have dimensions on the order of the pore spacing in a conventional porous dielectric medium. Embedded unitary electrodes are vapor deposited on either end of the channel structure to provide the electric field necessary for electroosmotic flow.

9 Claims, 1 Drawing Sheet

ELECTROKINETIC PUMP

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS-REFERENCE TO RELATED APPLICATIONS

Not applicable.

BACKGROUND OF THE INVENTION

The present invention is directed to an electrokinetic pump wherein the porous dielectric medium is comprised of a patterned microstructure fabricated by lithographic patterning and etching of a substrate. The microstructure can be comprised of features arranged so as to create an array of microchannels whose dimensions are on the order of the pore spacing in a conventional porous dielectric medium.

Electrokinetic pumps (EKP) are devices for converting electrical potential to hydraulic power. They comprise generally at least one tube or channel, that can be a capillary channel or microchannel, forming a fluid passageway containing an electrolyte and having a porous dielectric medium disposed therein between one or more spaced electrodes. The porous dielectric medium can include small particles, high surface area structures fabricated within the microchannel, or microporous materials. An electric potential is applied between the electrodes that are in contact with the electrolyte, that can be aqueous or an organic liquid or mixtures thereof, to cause the electrolyte to move in the microchannel by electro-osmotic flow. The electric field applied across the EKP by the electrodes will cause the electrolyte contained in the porous dielectric medium to flow and if presented with an external flow resistance will create a pressure at the down stream end of the EKP. The flowrate of the electrolyte is proportional to the magnitude of the applied electric field (V/m applied across the EKP) and the pressure generated is proportional to the voltage across the device. The direction of flow of the electrolyte is determined by both the nature of the electrochemical interaction between the porous dielectric medium and the electrolyte and the polarity of the applied electric potential. Moreover, an EKP can be realized by integrating part or all of the described components on a chip or micro-scale device, i.e., a device wherein the components have features with dimensions less than about 0.1 mm. Thus, the EKP is a compact and efficient device that converts electric power to hydraulic power in the working fluid and has been shown to be capable of generating hydraulic pressures greater than 10000 psi. A detailed discussion of the theory and operation of the electrokinetic pumping process can be found in prior co-pending U.S. Pat. Nos. 6,013,164 and 6,019,882, both entitled ELECTROKINETIC HIGH PRESSURE HYDRAULIC SYSTEM, assigned to the same assignee, and incorporated herein by reference in their entirety.

One example of a porous dielectric medium used in an EKP is a packed bed of dielectric particles that have a diameter of between 100 nm and 5 μm and form a bed having a pore size of between about 2–200 nm.

One problem associated with using particulate materials as the porous dielectric medium is packing capillary tubs or microchannels for use on microchips. As the channel diameter decreases it becomes more difficult to pack the microchannel in a uniform and reproducible way. Irregularities in the uniformity of the porous dielectric, both along the length and across the diameter of the column, affects device performance.

For particles between 1 and 20 μm in diameter slurry techniques can be used. In slurry packing the particles that form the bed are suspended as a slurry in an appropriate liquid or liquid mixture. Many liquids or liquid mixtures can be used to prepare the slurry, the principal requirement being that the liquid thoroughly wet the packing particles and provide adequate dispersion of the packing material. The slurry is then pumped into the microchannel. However, as the diameter of the column or channel decreases it becomes necessary to apply higher pressures to force the slurry into and through the column and pressures of 200 to 500 atm are not uncommon. In addition to the obvious hazard of having to work with very high pressures exerted on relatively thin walled structures, there are other disadvantages to this method of microchannel packing. When the pumping pressure is released at the conclusion of the packing operation the restraining force on the particle bed is partially lost causing an expansion of the particle bed. Then, when the microchannel is once again pressurized, heterogeneities or irregularities, can occur in the particle bed.

Instead of pressure, electro-osmotic flow can be used to carry particles into a capillary or microchannel from a reservoir of particles suspended in solution. This method of packing capillary columns suffers the disadvantages of needing very high voltages and a pre-formed porous plug for operation. A porous plug or other particle retaining means must be installed at the exit end of the microchannel prior to filling to prevent the particles from passing directly through the channel during the filling operation. Porous plugs are difficult to fabricate for microchannels, generally requiring that the material that composes the porous plug be positioned somehow at the appropriate place in the microchannel. The material is sintered to form a plug that must retain structural integrity as well as a high degree of porosity, while simultaneously fusing the plug to the wall of the capillary.

In general, none of the aforementioned methods generate packed beds with optimal uniformity and they can require relatively complicated hardware to perform.

SUMMARY OF THE INVENTION

Accordingly, the present invention provides an array of microchannels as the porous dielectric medium for electrokinetic pumps. The microchannels, that can be formed by conventional lithographic patterning and etching of a substrate, have dimensions on the order of the pore spacing in packed porous beds of dielectric particles. Embedded unitary electrodes are vapor deposited on either end of the channel structure to provide the electric field necessary for electroosmotic flow.

DETAILED DESCRIPTION OF THE INVENTION

Figure 1:
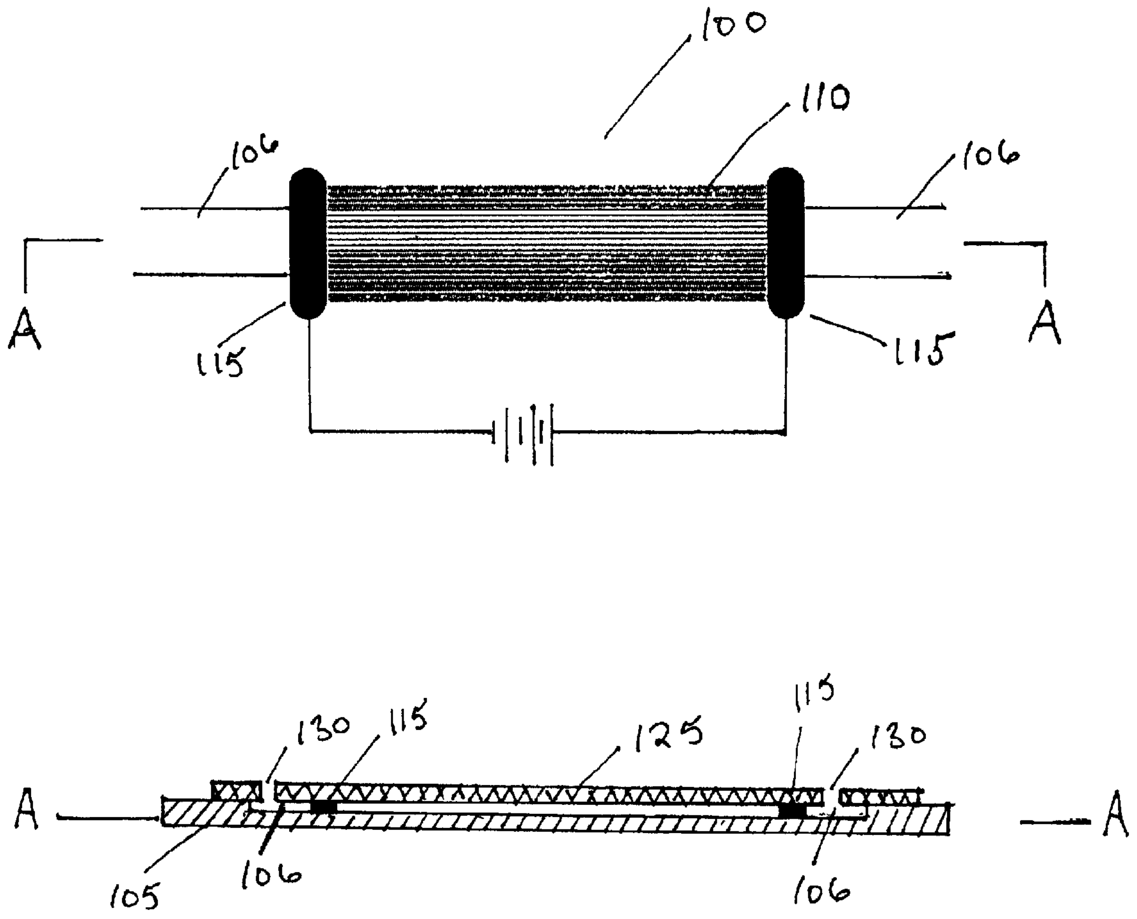
FIG. 1 illustrates an embodiment of the invention.

By providing patterned microchannels that can have an arbitrary configuration but whose dimensions approximate that of the pores of a porous packed bed the electrokinetic pump (EKP) of the present invention eliminates the need for a particulate porous dielectric medium and thereby eliminates the problems with packing a capillary channel with a particulate packing material discussed above. It has been shown that by substituting patterned microchannels whose dimensions are ≈200 nm deep and ≈100 μm wide for the porous particulate dielectric phase used in conventional EKPs it is possible to fabricate an EKP capable of generating pressures in excess of 10000 psi. The EKP of the present invention is illustrated and exemplified by reference to FIG. 1

It should be noted that throughout the specification of the invention the terms "channel" and "microchannel" will be used interchangeably and synonymously.

Referring now to FIG. 1, EKP 100 is comprised of a fluid flow channel 110 disposed on a substrate 105, wherein fluid flow channel 110 is provided with inlet and outlet means 106 and patterned microchannels that here is comprised of a plurality of parallel, juxtaposed microchannels. The patterned microchannels, separated from one another as illustrated in FIG. 1, can be etched into the substrate, that can be a borosilicate glass, fused silica, or Zerodur™, a low expansion fused silica glass, using conventional lithographic methods. The internal dimensions of the microchannels reflect the pore dimensions of the conventional porous dielectric medium used in EKPs and can be generally on the order of several hundred nanometers (nm). It is preferred that the microchannels be about 200 nm deep and about 100 μm wide. A spacing between microchannels of about 50 μm is also preferred. The flow rate of this EKP is determined by the number of microchannels etched into the substrate.

An electrolyte, that can be an aqueous electrolyte solution, a pure organic liquid such as acetonitrile, methyl alcohol, ethyl alcohol and toluene, an aqueous solution, or a mixture of an aqueous electrolyte solution and a pure organic liquid, is contained within fluid flow channel in fluid communication with the plurality of microchannels.

Spaced electrodes 115 are disposed on either end of fluid flow channel 110 to provide the electric field necessary for electroosmotic flow through the patterned microchannels. However, rather than trying to make electrical connection with each individual microchannel as is the case in conventional prior art electroosmotic flow devices (cf. Ramsey in U.S. Pat. No. 5,858,195 and Published PCT Application No. WO96/04547, Parce in U.S. Pat. No. 5,885,470 and Pace in U.S. Pat. No. 4,908,112) embedded unitary electrodes 115, in contact with each of the plurality of microchannels and the electrolyte, are vapor deposited on either end of the channel structure. Means for applying an electric potential to said spaced electrodes, such as a battery or power supply, is also provided.

A cover plate 125, such as a borosilicate glass cover plate, can be thermally bonded to substrate as well as the channel separators thereby providing a leak-proof seal for each channel. Via holes 130 are provided in the cover plate for electrode connection as well as for admitting electrolyte to the pump microchannels. A combination of capillary action and application of an electric field can be used to fill the pump microchannels.

While the EKP embodiment illustrated in FIG. 1 is configured with a patterned array of parallel, juxtaposed microchannels, the arrangement or configuration of the patterned microchannels is immaterial, providing the microchannel dimensions reflect those of the pores in a porous packed bed and that the number of microchannels comprising the array is sufficient to provide the required fluid flow rate.

Just as it can be desirable to apply surface coatings to the particulate materials used for the porous dielectric medium in conventional EKPs to enhance the density of surface charge and thereby improve electroosmotic flow or to manipulate the sign of the surface charge to control the direction of electroosmotic flow, the walls of the etched microchannels can be coated with surface coatings for the same purpose.

We claim:

1. An electrokinetic pump, comprising:

a fluid flow channel disposed on a substrate, wherein said fluid flow channel is provided with fluid inlet and outlet means in fluid communication with said flow channel, and wherein said fluid flow channel is comprised of patterned microchannels;

an electrolyte contained within said fluid flow channel and in fluid communication with the patterned microchannels;

spaced electrodes disposed on either end of said fluid flow channel and in contact with said electrolyte, wherein each of said spaced electrodes comprise a unitary electrode in physical contact with each of a plurality of parallel juxtaposed microchannels that comprise the patterned microchannels; and means for applying an electric potential to said spaced electrodes.

2. The electrokinetic pump of claim 1, wherein the microchannels are about 200 nm deep.

3. The electrokinetic pump of claim 1, wherein the microchannels are about 100 μm wide.

4. The electrokinetic pump of claim 1, wherein the microchannels are spaced about 50 μm apart.

5. The electrokinetic pump of claim 1, wherein said electrolyte is an aqueous electrolyte solution.

6. The electrokinetic pump of claim 1, wherein said electrolyte is a pure organic liquid.

7. The electrokinetic pump of claim 6, wherein the pure organic liquid is selected from the group consisting of acetonitrile, methyl alcohol, ethyl alcohol and toluene.

8. The electrokinetic of claim 1, wherein the electrolyte is a mixture of an aqueous electrolyte solution and a pure organic liquid.

9. The electrokinetic pump of claim 1, where the walls of the patterned microchannels are coated with a coating to enhance the density of surface charge and thereby improve electroosmotic flow or to manipulate the sign of the surface charge to control the direction of electroosmotic flow.

* * * * *